United States Patent [19]
Knudsen

[11] Patent Number: 5,386,098
[45] Date of Patent: Jan. 31, 1995

[54] ARRANGEMENT FOR ELECTRICALLY HEATING PARKING AREAS FOR WINDSHIELD WIPERS

[75] Inventor: William Knudsen, Livonia, Mich.

[73] Assignee: Chrysler Corporation, Highland Park, Mich.

[21] Appl. No.: 168,495

[22] Filed: Dec. 22, 1993

[51] Int. Cl.⁶ ............................................. H05B 3/84
[52] U.S. Cl. ....................................................... 219/203
[58] Field of Search ........................ 219/203, 202, 522; 15/250.05

[56] References Cited

U.S. PATENT DOCUMENTS

| | | | |
|---|---|---|---|
| 4,004,126 | 1/1977 | Boaz | 219/203 |
| 4,109,133 | 8/1978 | Hanle et al. | 219/203 |
| 4,373,130 | 2/1983 | Krasborn et al. | 219/203 |
| 4,378,484 | 3/1983 | Kunert | 219/203 |
| 4,520,258 | 5/1985 | Grohmann | 219/203 X |
| 4,549,471 | 10/1985 | Kochy et al. | 98/2.09 |
| 4,673,797 | 6/1987 | Weirick | 219/203 |
| 4,910,380 | 3/1990 | Reiss et al. | 219/203 |
| 4,967,437 | 11/1990 | Morse | 15/250.07 |
| 4,971,848 | 11/1990 | Ruelle et al. | 219/203 X |
| 5,173,586 | 12/1992 | Gold | 219/203 |

FOREIGN PATENT DOCUMENTS 2-144247  6/1990  Japan ................................... 219/203

*Primary Examiner*—Teresa J. Walberg
*Attorney, Agent, or Firm*—Wendell K. Fredericks

[57] ABSTRACT

An arrangement for heating upper and lower windshield wiper blades parked proximate the lower edge of a windshield utilizes an electric heating grid placed against the inside surface of the windshield, substantially in alignment with the parked wiper blades. The electric heating grid is comprised of a first wire in alignment with the lower blade, an intermediate wire and an upper wire in alignment with the upper blade. The wires have opposite ends which are connected to busses that are disposed at the lower edge of the windshield, the busses having leads for connection to power circuitry. The power circuitry includes a climate control system having a switch which is rotatable to a defrost position. When the switch is rotated to the defrost position so that the climate control system defrosts the windshield, current flows through the grid. As long as the switch is in the defrost position, the current continues to flow. The power circuitry also includes a windshield wiper deicing switch which operates independently of the defrost switch. Associated with the windshield wiper deicing switch is a timer which opens the closed deicing switch after a selected interval of time. This arrangement provides an inexpensive reliable system for deicing windshield wiper blades because the wires are disposed on the windshield against the inside surface of the windshield.

7 Claims, 2 Drawing Sheets

ARRANGEMENT FOR ELECTRICALLY HEATING PARKING AREAS FOR WINDSHIELD WIPERS

1. Field of the Invention

The present invention relates to arrangements for heating windshield wipers. More particularly, the present invention relates to arrangements for heating windshield wipers utilizing electric current.

2. Background of the Invention

In freezing weather, windshield wiper blades can become frozen to the windshield of a motor vehicle when the wiper blades are in their parked position proximate the lower edge of the windshield. When one attempts to activate the windshield wipers, the torque of the motor applied through a driving linkage for oscillating the wipers may be insufficient to overcome the force with which the wipers are adhered to the windshield. The wiper blades may simply not move as the torque is applied which requires that the driver leave the car and manually break the adhesion between the windshield wiper blades and windshield. This is, of course, an undesirable aggravation. Further still, the linkage which connects the windshield wipers to the motor may fail if the torque of the motor is too high or a fuse may blow, resulting in wipers which are inoperable. Drivers who must use their vehicles immediately or who are impatient may then be tempted to drive without operating windshield wipers which is, of course, especially hazardous in winter when windshields can become covered with salt, snow and sand, obscuring the driver's vision. Even if the blades of the windshield wiper are not adhered, there is the difficulty of wiper blades having deposits of ice thereon which at least initially compromises their effectiveness. Accordingly, there is a need for an arrangement which prevents adhesion of windshield wiper blades to windshields and which prevents the accumulation of ice, frozen snow and frost on wiper blades.

The problem is recognized in the prior art in patents such as U.S. Pat. No. 4,549,471 to Kochy et al. in which heated air from a defroster system is directed by secondary air ducts to an area of the windshield where windshield wiper blades rest when the wipers are parked. A difficulty with this approach is that it is necessary to warm up the engine and heat the cooling fluid of the engine to a relatively high level before heated air is available for application to the windshield. This may take a considerable amount of time, especially on very cold days and tempt the driver to activate the windshield wipers before the ice and snow adhering the wipers the windshield has melted which can result in damage to the wipers or perhaps a blown fuse as described above. Another approach is set forth in U.S. Pat. No. 3,738,252 to Cardinale wherein a hot water radiator is disposed proximate the windshield wiper blade when the windshield wiper is in its parked position. Again, it takes time to heat the coolant to a level sufficient to begin melting ice during which time the driver may attempt to activate the windshield wipers before the ice is melted.

Perhaps in recognition of the deficiencies of arrangements such as those of Kochy et al. and Cardinale, U.S. Pat. No. 5,173,586 to Gold discloses positioning an electric heater on the outside of the windshield just below the wiper blade. This is, however, a complex relatively expensive arrangement wherein the heater for the wiper blade must be protected against moisture, wind and general environmental degradation due to exposure on the outside of the windshield. The heater is subjected to engine heat as well as moisture, low temperatures and wind-induced pressure differentials, all of which combine to compromise its reliability. The heater is subjected to the greatest environmental stress at a time when it is needed most and is thus more likely to fail at a time it is needed most.

In view of the aforementioned considerations, there is a need for an arrangement to heat windshield wiper blades when in their parked mode, wherein the arrangement is relatively inexpensive, reliable and has a relatively rapid response time.

SUMMARY OF THE INVENTION

It is an object of the present invention to provide a new and improved arrangement for heating windshield wiper blades when windshield wipers are in a parked mode.

In view of this object and other objects, the present invention is directed to an electric heater for windshield wiper blades wherein the electric heater is positioned in contact with the windshield, adjacent the inside surface of the windshield, at a location aligned with the location on the outside of the windshield against which the windshield wiper rests.

In a more specific embodiment, the electric windshield heater is in combination with a conventional control head switch to energize when an electric back light switch is activated or when a mode switch is activated to a windshield defrost setting. The electric heater times out in a selected time period when the electric back light circuit is activated without with the mode switch in defrost. When the mode switch is in its defrost mode, the electric window heater will remain on as long as the mode switch is at its defrost position.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
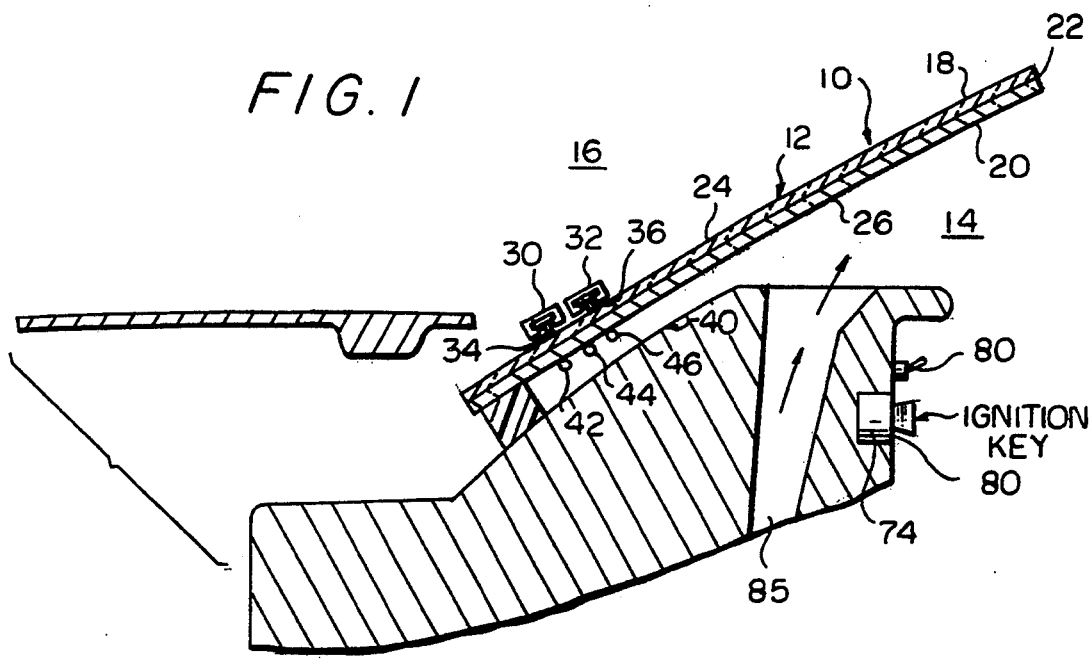
FIG. 1 is a side elevational view showing a windshield with a windshield wiper blade in its parked mode on the outside of the windshield and a windshield wiper heater, configured in accordance with the principles of the instant invention positioned on the inside of the windshield in alignment with the wiper blade.
Figure 2:
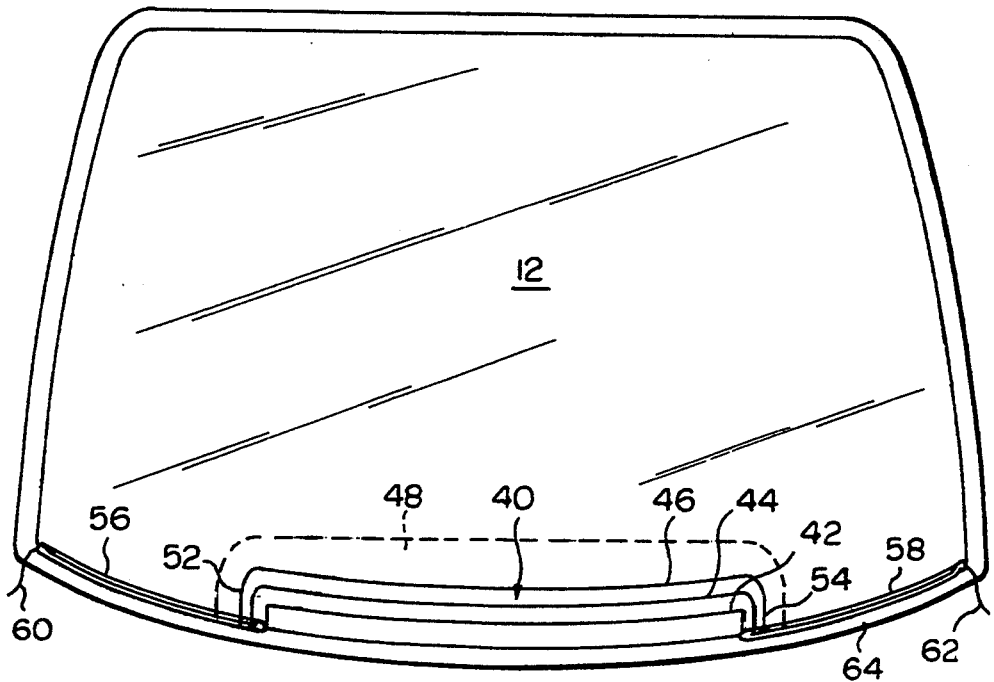
FIG. 2 is an interior plan view of the arrangement of FIG. 1 showing the configuration of the heating elements comprising the electric heater.

Referring now to FIGS. 1 and 2, there is shown an automotive vehicle 10 which has a windshield 12 which isolates the interior environment 14 of the vehicle from the external environment 16. Typically, the windshield 12 is fabricated of safety glass having an exterior panel 18 bonded to an interior panel 20 by a layer of adhesive 22. The windshield 12 has an exterior surface 24 which is exposed to the rigors of the external environment 16 and an interior surface 26 which is generally protected from the external environment since it is exposed primarily to the interior environment 14.

As is seen in FIG. 1, a pair of conventional windshield wipers 30 and 32 have rubber or synthetic rubber blades 34 and 36, respectively, which wipe the outer surface 24 of the windshield 12. In FIG. 1, the windshield wipers 30 and 32 are shown in their parked mode at the bottom of the windshield. Upon activation of a conventional windshield wiper motor (not shown), the wipers 30 and 32 oscillate to clean the outer surface of the window 24 but when the automotive vehicle is not being used, the windshield wipers 30 and 32 are in the position of FIG. 1. In cold, wet climates, snow and ice tend to accumulate around the windshield wipers and can adhere the windshield wiper blades 34 and 36 to the outer surface 24 of the windshield. This may occur due to a snow and ice storm or perhaps may occur when water kept liquid by the operation of a defrosting system or the vehicles engine freezes when the vehicle is not being used.

In accordance with the features of the present invention, an electric grid 40 on the inner surface 26 is disposed in alignment with the parking area on the outer surface 24 of the windshield 12 so as to locally heat the parking area. In the preferred embodiment, the electric heating grid 40 is comprised of three wires 42, 44 and 46, each of which is in abutment with the inner surface 26 of the windshield 12. The wire 42 is aligned with the wiper blade 34 of the lower windshield wiper 30 while the wire 46 is aligned with the wiper blade 36 of the upper windshield wiper 32. The wire 44 is disposed midway between the wires 42 and 46 so that the entire heating area 48 on the inside surface 26 of the windshield 10, disposed proximate the parking area 38 on the outside surface 24 of the windshield, is heated when the grid 40 is energized.

Figure 3:
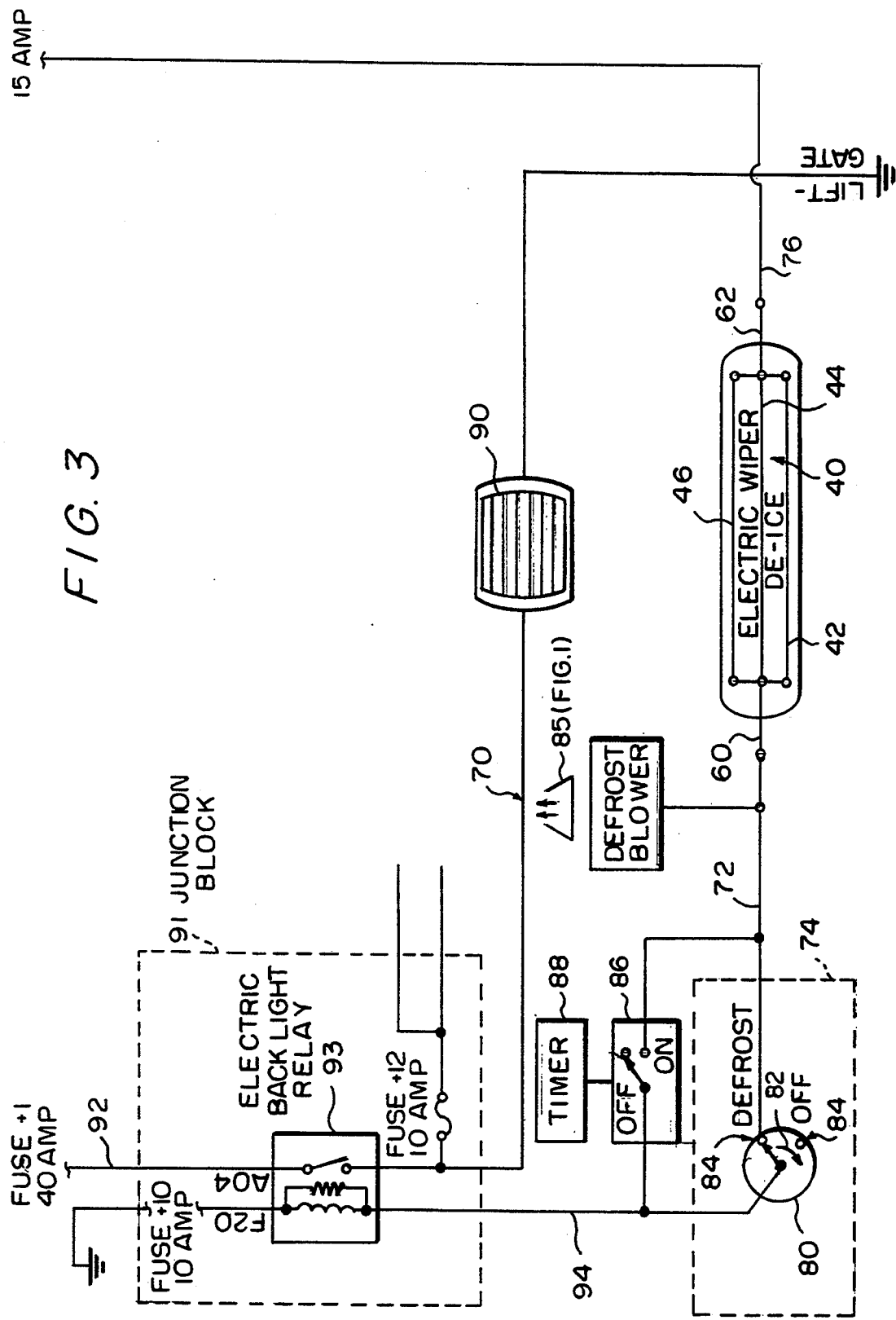
FIG. 3 is a circuit diagram showing an arrangement for integrating the electric heater for windshield wipers with a defrost system of the automotive vehicle.

As is seen in FIG. 2, the grid 40 is localized at the center of the windshield 12 with the heating wires 42, 44 and 46 converging at ends 52 and 54 to busses 56 and 58, respectively. The busses 56 and 58 have leads 60 and 62, respectively, which are connected to electrical power sources, as seen in FIG. 3. The busses 56 and 58 each extend proximate the lower edge 64 well out of the view of the driver and allow heat to be concentrated where it is most needed, generally in the area 48 where the windshield wipers 30 and 32 are parked.

Referring now to FIG. 3 where a circuit diagram for a control circuit 70 is shown, it is seen that the lead 60 connects the grid 40 to climate control circuitry 74 and line 76 connects the lead 62 to a fuse. The climate control circuit includes a rotary switch 80 which rotates between a number of positions including an off position 82 and a defrost position 84. When the rotary switch 80 is in the defrost position, operating the conventional defrost system (see chart 85 of FIG. 1) of the automobile, the heating grid 40 is energized and current flows through the lines 42, 44 and 46, heating the area 48 in the windshield. As long as the climate control system 74 is in the defrost mode, the grid will remain energized to deice wiper blades 34 and 36 (see FIG. 1). When the switch 80 is not rotated from the off to the defrost position, the grid 40 comprising the electric wiper deicer may still be operated by switch 86. The switch 86 includes a conventional timer 88 connected thereto which times out after 10 minutes, opening the switch 86 and interrupting current to the heating grid 40. Thus, the heating grid 40 may be activated by either the climate control system 74 of the automotive vehicle or by a separate isolated switch 86.

As is shown in FIG. 3, the control circuit 70 is associated with conventional electric back light circuitry which connects the electric back light 90 switch through a junction box 91 to a current source on line 92. An electric back light relay 93 closes when current flows over line 94.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

EXAMPLE

The following table recites parameters of a preferred grid system for a vehicular windshield which has worked effectively with the thickness of the wires being approximately 0.0005 inches.

| STUDY OF EWD (VERSION 3c) THREE PARALLEL GRID LINES | | | | |
|---|---|---|---|---|
| | BUSS 56 | TOP wire 46 | MIDDLE wire 44 | BOTTOM wire 46 | BUSS 58 |
| LENGTH mm | 394 | 1029.7 | 954.7 | 888 | 394 |
| WIDTH mm | 7 | 0.8 | 0.6 | 0.6 | 7 |
| Reach ohm | 0.263844 | 6.033527 | 7.458752 | 6.906397 | 0.263844 |
| Rsegment ohm | 0.263844 | | 2.249190 | | 0.263844 |
| Rewd ohm | | | 2.776879 | | |
| Vewd volts | | | 13 | | |
| Iewd amp | | | 4.681513 | | |
| Ieach amp | 4.681513 | 1.745183 | 1.411712 | 1.524617 | 4.681513 |
| Peak watt | 5.782574 | 18.37610 | 14.86478 | 16.05363 | 5.782574 |
| Pneeded (P/A = 0.5 watt/in) | 73% | −10% | −26% | −8% | 73% |
| P/A | 0.73 | 0.45 | 0.40 | 0.46 | 0.37 |

In the above table, denotion "ewd" means "electric window defrost". The denotion "R" refers to resistance; "I" denotes current; "V" denotes voltage and "P" denotes power.

The preceding examples can be repeated with similar success by substituting the operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In combination, a windshield for an automotive vehicle having an outside surface exposed to the environment and an inside surface shielded from the environment, wherein the outside surface has a parking area thereon against which a pair of windshield wiper blades rest when in a parked mode with a first wiper blade being disposed below a second wiper blade, a windshield wiper heater comprising a single electric grid disposed in direct contact with the inside surface at an area substantially coextensive with the parking area of the outside surface, and a power circuit for supplying electric current connected to the grid, whereby upon applying electric current through the electric grid, the parking area of the windshield is heated for the purpose of melting ice or snow accumulated around the windshield wiper blades.

2. The combination of claim 1, wherein the grid is comprised of three wires, the first of which is coextensive with the first windshield wiper blade when the blades are coextensive with the parking area, the second of which is disposed between the first and second windshield wiper blade and the third of which is coextensive with the second windshield wiper blade when the blades are coextensive with parking area.

3. The combination of claim 1, wherein the parking area on the front surface of the windshield is spaced by selected distances from side edges of the windshield and wherein the grid is disposed only in an area substantially aligned with the parking area, the grid having first and second ends which are joined to first and second busses which extend from the grid to locations proximate the side edges of the windshield, the busses having leads thereon for connection to the power circuit.

4. The combination of claim 3, wherein the power circuit for the electric heating grid includes a climate control system for the interior of the automotive vehicle, the climate control system having a defrost setting for causing air to heat the entire windshield, the climate control system having a mode control switch connected to the electric heating grid wherein when the switch is in a defrost setting, the electric heating grid is energized.

5. The combination of claim 4, wherein the wires of the electric heating grid have a diameter of about 0.0005 inches.

6. In combination, a windshield for an automotive vehicle having an outside surface exposed to the environment and an inside surface shielded from the environment, wherein the outside surface has a parking area thereon spaced by selected distances from the side edges of the windshield against which a pair of windshield wiper blades rest when in a parked mode, with a first wiper blade being disposed below a second wiper blade, a windshield wiper heater comprising a single electric grid disposed in direct contact with the inside surface at an area substantially coextensive with the parking area of the outside surface, wherein the grid is comprised of three wires each having a thickness of about 0.0005 inch, the first of which is coextensive with the first windshield wiper blade when the blades are coextensive with the parking area, the second of which is disposed between the first and second windshield wiper blade and the third of which is coextensive with the second windshield wiper blade when the blades are coextensive with the parking area; and wherein the grid is disposed only in an area substantially coextensive with the parking area, the grid having first and second ends which are joined to first and second busses which extend from the grid to locations proximate the side edges of the windshield, the busses each having leads extending therefrom, a power circuit for supplying electric current to the grid connected to the leads, wherein upon applying electric current through the electric grid, the parking area of the windshield is heated for the purpose of melting ice or snow accumulated around the windshield wiper blades;

a climate control system for the interior of the automotive vehicle, the climate control system having a defrost duct for defrosting the windshield above the grid, the climate control system having a mode control switch connected to the electric heating grid wherein when the switch is in a defrost setting, the electric heating grid is energized; and a separate deicing switch disposed and parallel with the defrost switch for connecting the electric heating grid to the power source independently of the defrost switch, the separate deicing switch having a timer associated therewith for opening the separate deicing switch after a selected period of time so as to interrupt power to the electric heating grid.

7. The combination of claim 6, wherein the wires have a resistance in the range of about 6.0 ohms to about 7.5 ohms.

* * * * *